United States Patent Office 3,268,067
Patented August 23, 1966

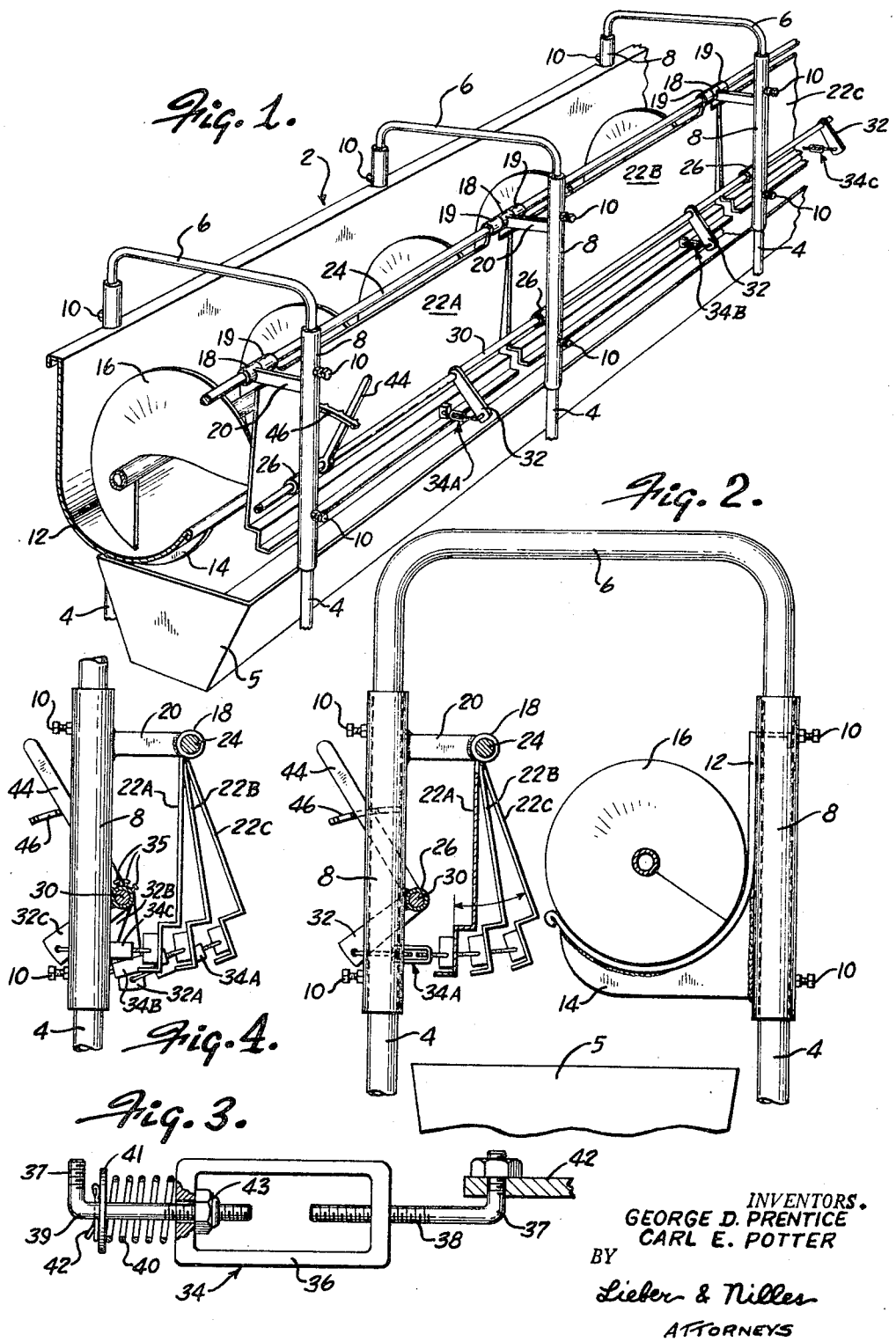

3,268,067
FEED DISTRIBUTOR
George D. Prentice, Glendale, and Carl E. Potter, Fond du Lac, Wis., assignors to A. F. Klinzing Co., Inc., Milwaukee, Wis., a corporation of Wisconsin
Filed June 14, 1965, Ser. No. 463,815
10 Claims. (Cl. 198—213)

This invention relates to an improved auger feeder such as is used to distribute feed to elongated bunkers for simultaneous consumption by a large number of animals.

Unequal filling of feed bunkers for animals tends to cause the animals to crowd toward the filled portions of the feeder. This crowding often results in only the more physically fit or stronger animals receiving sufficient food. The problem is accentuated by the fact that, in common practice, the feeder is loaded at one end from a silo or other bulk storage structure and transported therefrom down the length of the bunkers. Unless special precautions are taken during the operation of the feeder, the end of the bunker nearest the bulk storage area becomes filled to a greater extent than the portions further away resulting in crowding of the animals near the bulk storage structure.

Further, modern methods of raising and fattening cattle, and other animals, require that they be fed accurately controlled amounts of grain, hay, feed, nutrients, and other feed supplements in order to obtain the desired results. The high cost of the latter ingredients also requires accurate control of their use if an economically profitable operation is to be obtained.

Prior commercially available feeders have often been less than satisfactory in that they failed to fill the bunkers equally along their length, or have failed to accurately control the amount of feed deposited in the bunkers. Additionally, these feeders have not been provided with satisfactory means for closing the gates during the periods between feedings, thus resulting in overfeeding of animals and/or waste of feed.

This invention, therefore, provides an improved auger feeder which is capable of dispensing substantially equal amounts of grain along its length in a most satisfactory and efficient manner.

This invention further provides an auger type feeder having an improved adjustable opening and closing means to most accurately control the amount of feed dispensed to cattle or other animals while permitting ready adjustments to be effected along the length of the feeder.

This invention further provides for a simple, mechanically sound structure to control such dispensing and one which is capable of giving substantially trouble-free service for substantial periods of time while also insuring complete gate closure and shut-off of feed flow during interim periods.

Specifically, the invention provides for an auger feeder having a frame structure surrounding the feed bunker comprised of a plurality of pairs of opposing vertical standards. A plurality of collars are adjustably mounted on the standards. On the collars mounted on one standard of each of the pairs is placed a hook-shaped trough having an auger screw mounted therein. A means to control the dispensing of material from the trough is mounted on the other standard of each of the pairs. This means includes a plurality of gates pivotally mounted on the collars on the other standards which form a material dispensing opening in coaction with the trough. A shaft is mounted in bearing means on said collars, adjacent the gates. The shaft has a plurality of levers affixed thereto each of which are connected to the gates by means of a linkage. The linkages are sized to position the gates so as to cause the material distributing opening to increase in size along the length of said trough in a direction away from the material supply end. The linkages may be adjustable to permit varying the material distributing opening provided by any given gate in relation to the openings provided by the other gates while also embodying means to completely close all of the gate sections throughout the length of the feeder. The shaft may be rotatable to permit the entire material opening to be increased or decreased while maintaining the relationship between each individual gate.

Further provisions of the invention will be more clearly understood by reference to the following specifications and drawings, forming a part thereof, in which:

FIGURE 1 is a perspective view of the auger feeder of the present invention.

FIGURE 2 is a cross-section view of the feeder showing details of the opening and closing means.

FIGURE 3 is a view of link of adjustable length which may be employed in the present invention.

FIGURE 4 shows an alternate embodiment of the auger feeder of the present invention.

Referring now to the drawing, there is shown in FIGURE 1 an auger feeder of the present invention indicated by the numeral 2. A frame structure for the feeder preferably comprises vertical standards 4 positioned in the ground over feeding bunker 5. The standards are shown grouped in pairs which are positioned opposite each other and are joined by lateral support members 6, but the auger may be supported by other suitable framework. If desired, standards 4 and the lateral support members 6 may be formed from a single U-shaped piece.

Shown mounted on each of the standards 4 is an elongated collar 8. Collars 8 have set screws 10 for adjustably positioning the collars on standards 4. The position of collars 8 on standards 4 is generally determined by size of the feeding bunkers from which the cattle, or other animals, are fed.

A trough member 12 generally shaped in the form of a J is affixed to the collars 8 positioned on one standard 4 of each of the pairs. Trough 12 may be supported by a bracket 14 on the lower portion of collar 8. Mounted in trough 12 is auger screw 16 which, when rotated, distributes feed, or other granular material from a bulk storage structure, not shown, along the length of trough 12.

A means to control the dispensing of material from trough 12 is mounted on the collars 8 on the other standard 4 of each of the pairs. This means is shown as including a plurality of gates, as for example, gates 22A, 22B, and 22C pivotally mounted on collars 8. The pivotal suspension mounting may comprise a journal bracket 18 having a rod 24 extending therethrough. Rings or tubes 19 on the upper edge of gate 22 surround shaft 24 for free swinging movement to form a hinge therewith. The lower edge of gate 22 may be shaped to mate with the outer portion of trough 12.

A shaft 30 is journalled in bearings 26, which are also mounted on collars 8. A plurality of levers 32 are fixedly attached to shaft 30. At least one such lever is required for each gate 22A, 22B, and 22C. The levers 32 are joined to gates 22A, 22B, and 22C by means of adjustable links 34 which determine the position of the respective gates or gate sections when the feeder is in operation.

To provide for even distribution of feed throughout the length of the feeder, the material dispensing opening between the edge of the trough and the several gates is variable in size. In general, this opening is adjusted to increase along the trough in a direction away from the bulk storage structure from which the feeder is being supplied. For example, the lower edge of gate 22A as adjustable to be closer to the outer lip portion of trough 12 than the lower edge of gate 22B. Similarly, the lower edge of gate 22B is adjustable to be closer to the outer portion of trough 12 than the lower edge of gate 22C. This positioning of gates 22A, 22B, and 22C overcomes the natural tendency of the feeder to supply more material to the end of the bunker closest to the bulk storage structure and may be varied for different consistencies of feed.

The relative positioning of the gates may be obtained by adjusting the length of links 34 or by varying the angular relationship in the position of levers 32 on shaft 30 as by means of set screws 35 (FIG. 4). In the former instance, link 34A is adjusted to be longer than link 34B while link 34B is adjusted to be longer than 34C. This may be done by inherently forming the links of different lengths or preferably by employing a means for varying the length of the links. FIGURE 3 shows a preferred structure wherein the link 34 is constructed in the form of a turnbuckle comprising a threaded body or sleeve 36 and at least one threaded rod 38, 39. The ends of the rod or rods 38, 39 may be bent as at 37 to form hooks adapted for reception respectively by flanges 42 mounted on the respective gates 22A, 22B, and 22C and by the levers 32A, 32B and 32C to thus provide a means of affixing links 34 to levers 32.

While one or both of the rods 38, 39 of FIG. 3 may be formed for threaded coaction with the body member 36, the embodiment shown in FIG. 3, possesses certain definite advantages. In this embodiment, the link 34 is spring loaded to not only provide for variable gate adjustments along the length of the feeder 2 when the gates are swung to open position but to also permit complete closure of all gate sections against the action of the springs 40 when it is desired to cease the feeding operation entirely and prevent seepage of material.

As shown, each of these links 34 of FIG. 3 has the rod 38 threaded for adjustment in the body 36. However, the rod 39 is slidably received by the body 36 and is embraced by a spring 40 compressed between the adjacent end of the body 36 and a washer 41. The position of the washer 41 is fixed by a pin 42 or the like, and the compression of the spring 40 and the length of the link may be varied as by means of a nut 43 threaded on the shank of the rod 39. Thus, the normal length of each link may be variably adjusted to provide for differing feed openings in the successive zones, but all gate sections may be fully closed against the pressure of the spring 40.

FIGURE 4 shows an alternative embodiment of the invention in which links 34 are of uniform length and the relative angular positions in which the levers 32 are affixed to shaft 30 is variable to provide for adjusting the positions of gates 22A, 22B, and 22C to vary the material discharge opening. Lever 32B is affixed to shaft 30 in a more clockwise position than lever 32A to provide a larger material discharge opening along gate 22B than along gate 22A. Likewise, lever 32C is affixed to shaft 30 in a still more clockwise position than lever 32B to provide an even greater material opening along gate 22C, the adjustments being effected in this case by the set screws 35.

To provide for the movement of the gates simultaneously without disturbing the positional relationship between the gates, shaft 30 may be rotatably mounted in bearings 26. A handle 44 may be provided to assist in the rotation of shaft 30 and pivotal movement of the shaft 30 thus swings all gates simultaneously. A bracket 46 which stops may also be provided adjacent handle 44 to retain the handle and shaft 30 in any desired position, and since the actuating force is applied to the gates adjacent their lower extremities and remote from their pivotal suspension mounting, the closing torque or resistance is most effectively overcome.

Prior to operation, the position of gates 22A, 22B, and 22C are adjusted to obtain the above described material dispensing opening between the outer portion of trough 12 and each of the gates. This may be done by altering the length of an adjustable link such as shown in FIGURES 2 and 3 or by varying the position of levers 32 by means of the set screws as shown in FIGURE 4. The gates are positioned so that the material dispensing opening increases as the distance from the end of the trough being supplied with the material increases. Auger screw 16 may then be operated resulting in the most uniform supply of feed to the bunker below. If, because of a change in the material being supplied to the bunker or because of the necessity to supply a greater or lesser amount of material in a given time, handle 44 may be operated to increase or decrease the entire material discharge opening.

From the foregoing detailed description, it will be apparent that a feed distributing device is provided which comprises generally an elongated trough having one upstanding side wall extending laterally therefrom to provide an open side through which feed is adapted to be distributed. An auger-type conveyor is rotatably supported within the trough for conveying feed along the same. The open side of the trough has a plurality of gates swingably supported at their upper extremities on a common pivot shaft, the gates being spaced longitudinally along the open side. To swing the gates toward and away from the adjacent edge of the bottom wall, actuating means operable from a single station is connected to the gates below and remote from the pivot shaft which is the most advantageous location for overcoming resistance to closing while eliminating the normal tendency for each gate to remain open due to the inherent resiliency of the gate between its suspension point and its lower edge. Finally, means are provided for independently adjusting the relative positions of the gates or gate sections about the pivot shaft from which the gates are supported in order to provide variable discharge openings longitudinally of the trough.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

Various modes of carrying out the invention are contemplated as being within the scope of the following claims particularly pointing out and distinctly claiming the subject matter that is regarded as the invention.

We claim:

1. A feed distributing device comprising, an elongated trough having one upstanding side wall and a bottom wall extending laterally therefrom to provide an open side, an auger rotatably supported within said trough for conveying feed therealong, a plurality of gates for successive sections of the open side of said trough, said gates being spaced longitudinally of said trough and being swingably supported at their upper extremities on a common pivot shaft, means connected to said gates below and remote from said pivot shaft and operable from a single station for simultaneously swinging all of said gates toward and away from the adjacent edge of said bottom wall, and means for independently adjusting the relative positions of said gates about said pivot shaft to thereby provide variable discharge openings longitudinally of said trough.

2. A feed distributing device according to claim 1, wherein the means for independently adjusting the relative positions of the gates is incorporated with the means for simultaneously swinging all of the gates toward and away from the bottom wall.

3. A feed distributing device according to claim 2, wherein the means for independently adjusting the relative positions of the gates includes adjustable linkages between each of the gates and the means for simultaneously swinging the same.

4. A feed distributing device according to claim 1, wherein the means for simultaneously swinging all of the gates toward and away from the bottom wall comprises a rotatable shaft provided with actuating means for rotating the same and coupled to the gates through motion transmitting linkages.

5. A feed distributing device according to claim 4, wherein the motion transmitting linkages each include a lever fixed to the rotatable shaft and an adjustable link connected between the lever and its gate.

6. A feed distributing device comprising, an elongated trough having one upstanding side wall and a bottom wall extending laterally therefrom to provide an open side, an auger rotatably supported within said trough for conveying feed therealong, a plurality of gates for successive sections of the open side of said trough, said gates being spaced longitudinally of said trough and being swingably supported at their upper extremities on a common pivot shaft, a rotatable shaft connected to each of said gates below and remote from said pivot shaft and operable from a single station for simultaneously swinging all of said gates toward and away from the adjacent edge of said bottom wall, and means for independently adjusting the connectings between said rotatable shaft and said gates to effect changes in the relative positions of said gates about said gate supporting pivot shaft to thereby provide variable discharge openings longitudinally of said trough.

7. A feed distributing device according to claim 6, wherein the rotatable shaft is provided with a laterally extending actuating handle fixed thereto.

8. A feed distributing device according to claim 7, wherein means are provided for retaining the actuating handle in various positions of adjustment.

9. A feed distributing device according to claim 1, wherein the means for independently adjusting the relative positions of the gates includes at least one spring loaded link for each gate.

10. A feed distributing device according to claim 6, wherein the means for independently adjusting the connections between the rotatable shaft and each gate includes at least one spring loaded link.

References Cited by the Examiner

UNITED STATES PATENTS

| 2,643,032 | 6/1953 | Berndt | 222—254 |
| 3,105,586 | 10/1963 | Carew et al. | 198—64 |
| 3,209,898 | 10/1965 | Beebe et al. | 198—205 |

SAMUEL KOREN, *Primary Examiner.*

HUGH R. CHAMBLEE, *Examiner.*